Sept. 9, 1930.  E. E. EINFELDT  1,775,121
MEANS FOR CONVEYING ARTICLES
Filed May 11, 1926   7 Sheets-Sheet 3
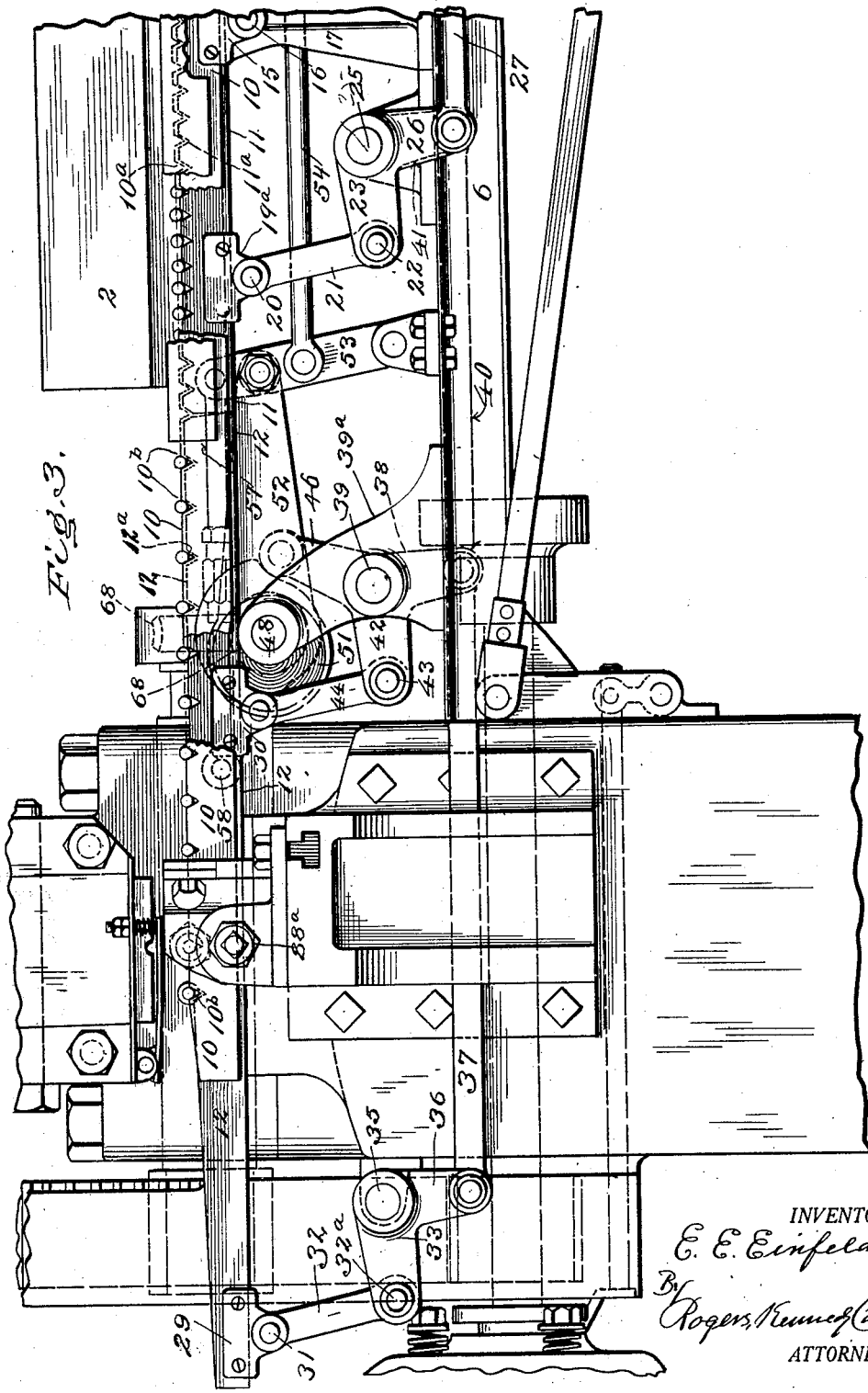
INVENTOR.
E. E. Einfeldt
By Rogers, Kennedy Campbell
ATTORNEYS.

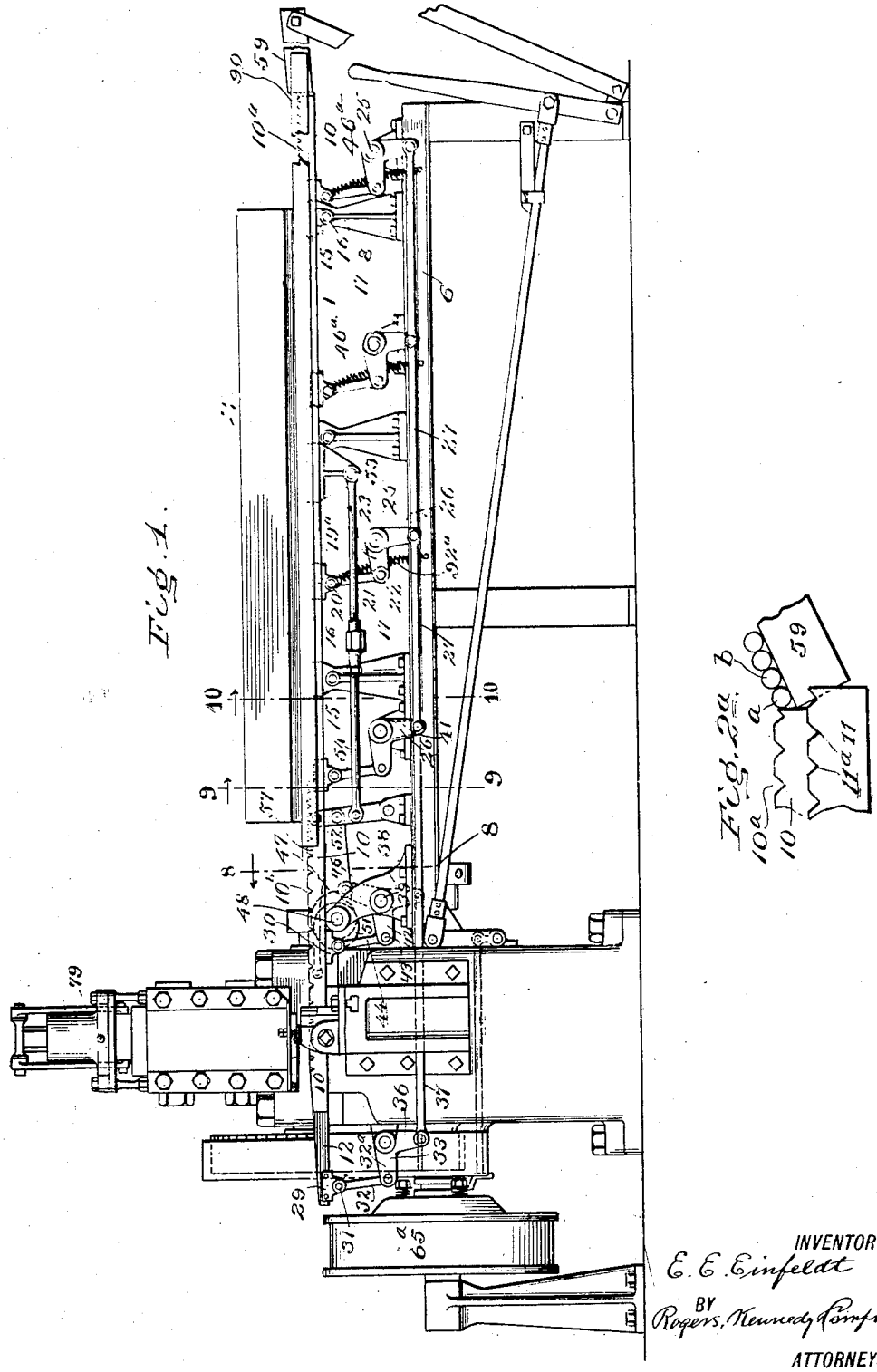

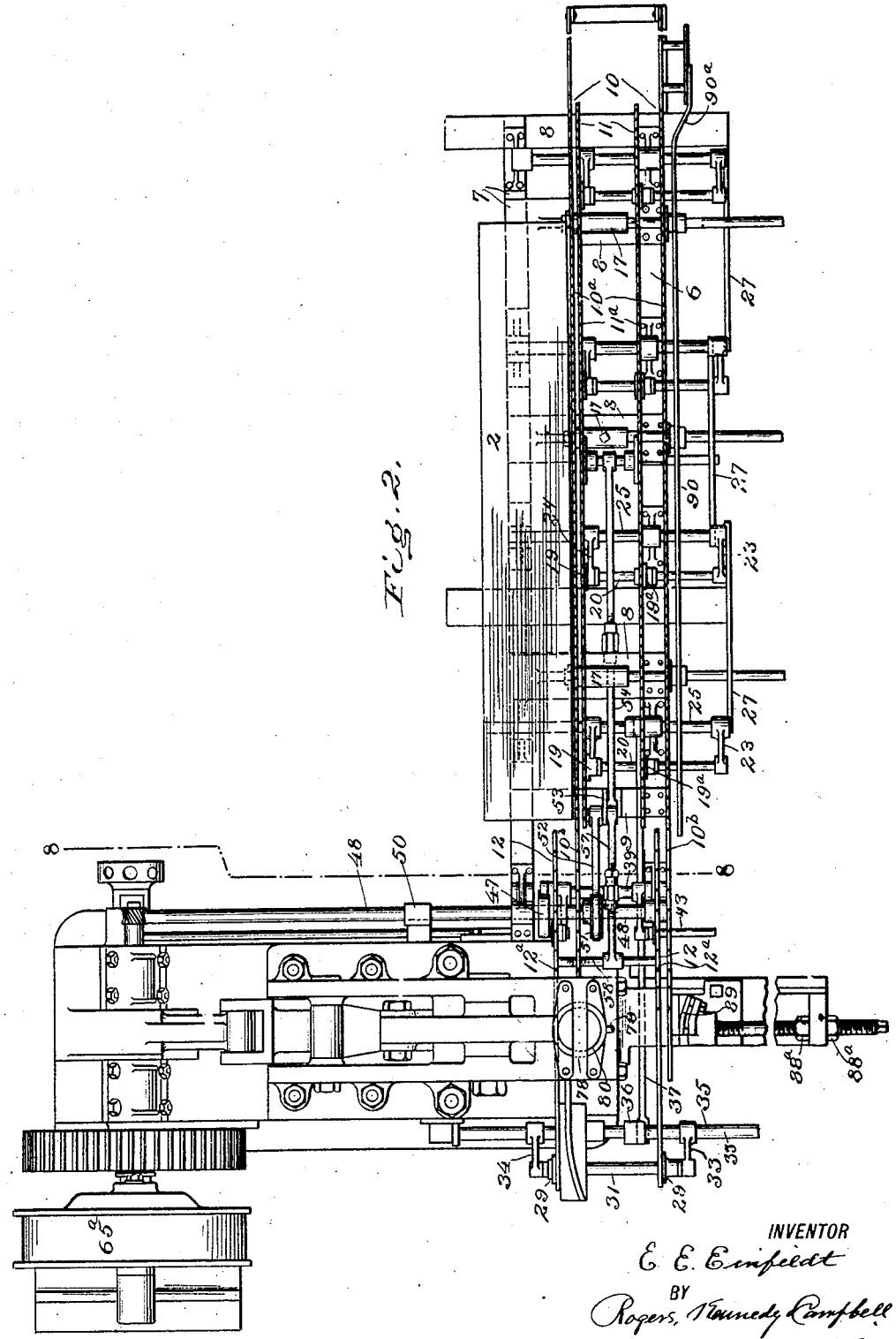

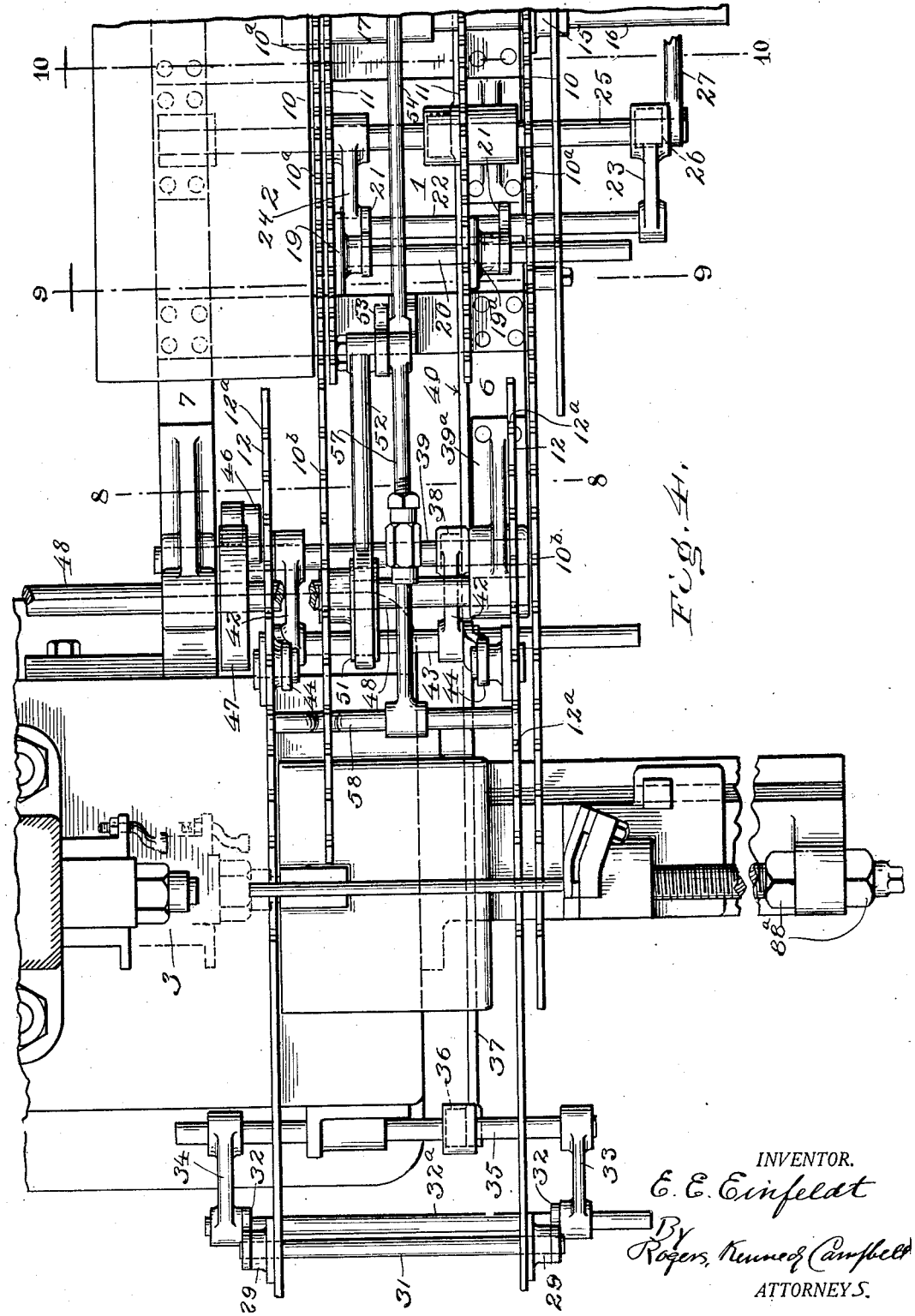

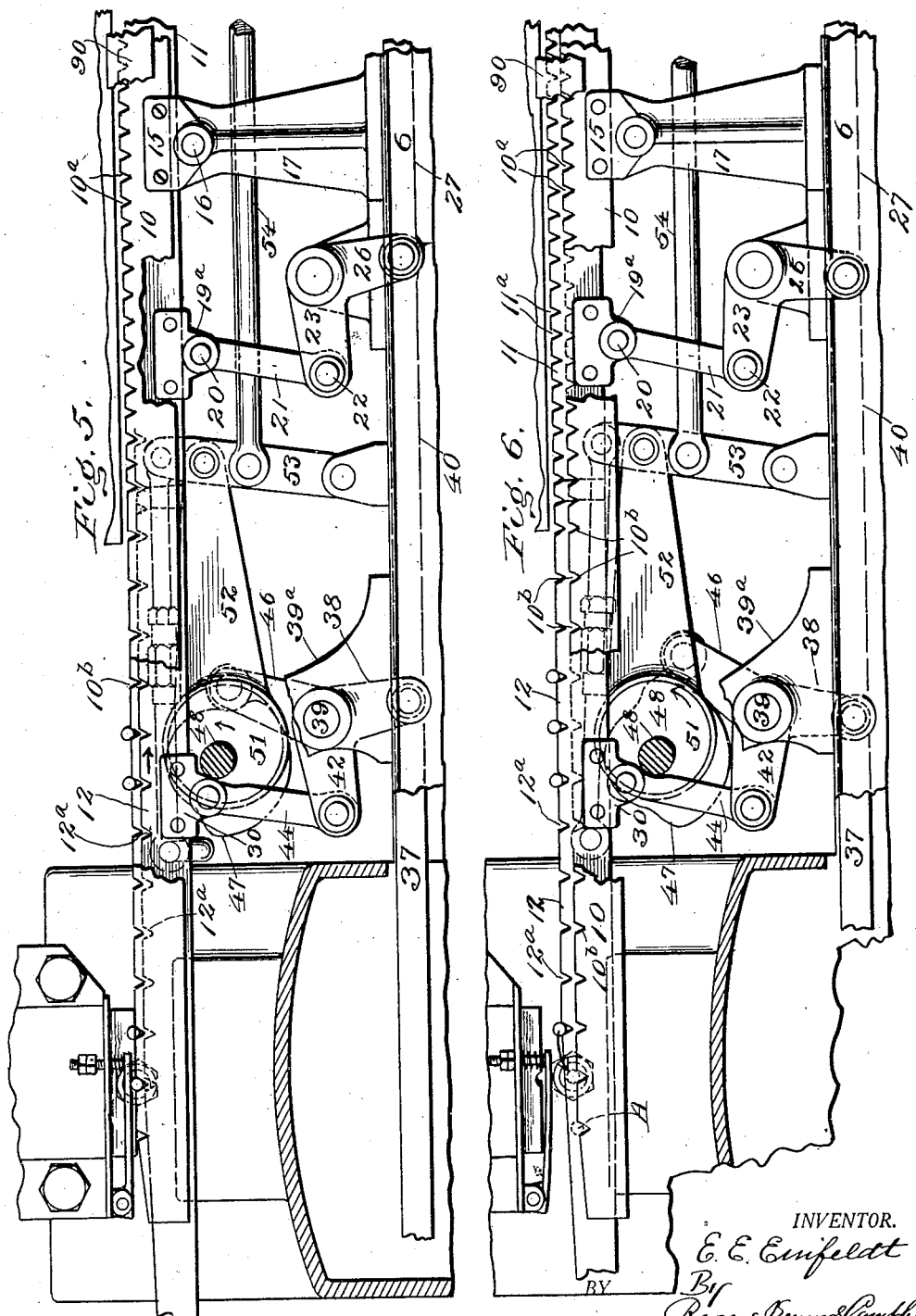

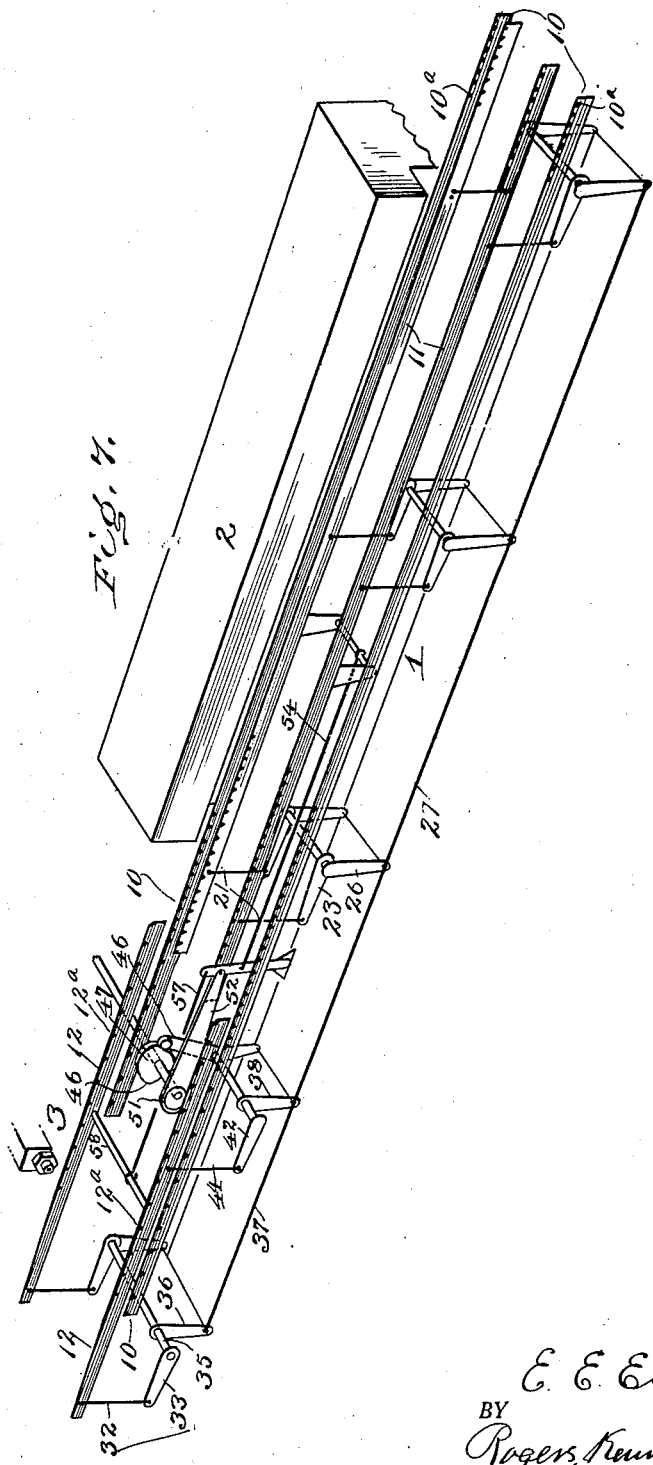

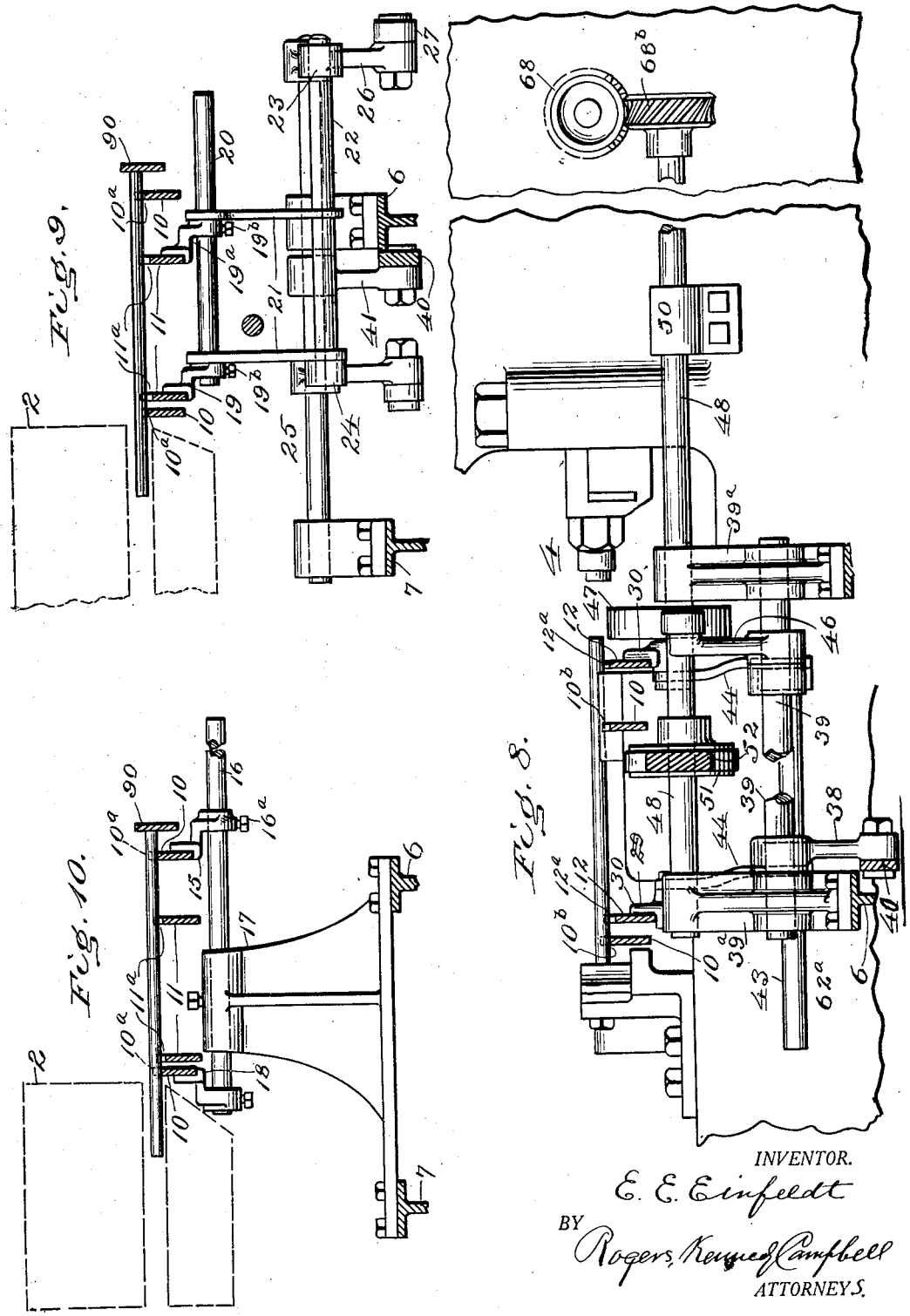

Patented Sept. 9, 1930

1,775,121

UNITED STATES PATENT OFFICE

ERNEST E. EINFELDT, OF DAVENPORT, IOWA, ASSIGNOR, BY MESNE ASSIGNMENTS, TO FRENCH & HECHT, INCORPORATED, OF DAVENPORT, IOWA, A CORPORATION OF IOWA

MEANS FOR CONVEYING ARTICLES

Application filed May 11, 1926. Serial No. 108,234.

This invention relates to conveying or feeding mechanism designed for conveying articles, such for instance as rods, spokes, and the like, and in accordance with the present invention such conveying mechanism is employed in connection with a spoke heating oven or furnace, and with a forging or shaping mechanism, in order that the ends of spoke blanks may be heated and their heated ends acted on by the forging or shaping mechanism to form a shoulder on the spokes, in order to facilitate their connection in a wheel structure.

The conveying or feeding mechanism of the present invention is of a form which will feed the spoke blanks in operative relation to, and while being subject to the heat of the furnace, at a comparatively slow rate of speed, and will feed the heated blanks after they leave the furnace, at a more rapid rate of speed, so that while there will be ample time afforded for the ends of the blanks to be brought to the proper forging temperature in the furnace, there will be little or no opportunity for loss of heat in the passage of the heated blanks from the furnace to the forging mechanism.

The conveying mechanism, in the embodiment of the invention illustrated, comprises a set of fixed horizontal supporting bars lying side by side in spaced relation and formed in their upper edges with aligned notches in which the spoke blanks are received and supported, a set of cooperating feed bars similarly formed with notches and movable relatively to the fixed bars, first upwardly to lift the blanks from the notches in the fixed bars, then forwardly to carry the lifted blanks in position to be placed in the next notches, then downwardly to deposit the blanks in the next notches, and finally rearwardly again to their starting position, the movements of the movable bars being thus in successive orbital paths, with the result that the spoke blanks will be fed forwardly as a group in successive intermittent advancing movements, the distance of a notch for each movement. In accordance with the present invention, two sets of fixed notch bars are provided, one set arranged as a continuation of the other, and the notches of the first set being in closer spaced relations to each other than those of the second set; and likewise there are provided two sets of movable bars to cooperate with the fixed bars, and the notches in these movable bars are in closer spaced relations in the first set than in the second set, and means are provided for imparting to the first set of movable bars, a movement of advance in each cycle of operation, corresponding to the closer spacing of the notches in said set, and for imparting to the second set of movable bars, a movement of advance in each cycle of operation, corresponding to the greater spacing of the notches in said second set. As a result of this construction and operation of the parts, the articles fed, will be advanced while acted on by the first set of feeding bars, at a given reduced rate of speed, and they will be advanced when acted on by the second set of movable bars, at a greater rate of speed, so that in handling spoke blanks for instance, which are to be heated and then headed or shouldered to adapt them to be connected in a wheel structure, the blanks advanced by the first set of feed bars will be caused to move slowly in operative relation to the heating furnace, whereby there will be given full time for the blanks to attain the proper temperature for forging, and the heated blanks advanced by the second set of feed bars will be caused to advance at a greater rate of speed in traveling from the furnace to the forging apparatus, so that there will be a minimum loss of heat from the heated blanks in their travel between the furnace and forging apparatus.

In the accompanying drawings:

Fig. 1 is a side elevation of the improved conveying mechanism showing the same in cooperative relation to a heating furnace and a forging or shaping mechanism.

Fig. 2 is a plan view of the same.

Fig. 2ª is a fragmentary view in elevation, showing how the articles are presented to the action of the conveying mechanism.

Fig. 3 is an elevation on an enlarged scale of that portion of the conveying mechanism which conveys the heated spokes from the furnace to the forging device, and showing also said forging device.

Fig. 4 is a top plan view of the same.

Fig. 5 is a longitudinal sectional elevation on an enlarged scale through one end of the conveying mechanism.

Fig. 6 is a similar view with the parts in a different position.

Fig. 7 is a diagrammatic perspective view showing the relation of the two sets of fixed and movable feeding bars to the heating furnace and the forging mechanism.

Fig. 8 is a transverse sectional elevation on the line 8—8 of Fig. 1.

Fig. 9 is a similar view on the line 9—9 of Fig. 1.

Fig. 10 is a view similar to Fig. 9 with the parts in a different position.

Referring to the drawings:

As shown more particularly in Figs. 1, 2 and 7, the improved conveying mechanism 1 is illustrated as employed in connection with a heating oven or furnace 2 and with a forging mechanism 3, the conveying mechanism acting to advance the spoke blanks, with their ends projecting into the heating zone of the furnace as shown in Figs. 9 and 10, and operating to convey the heated spoke blanks from the furnace to the forging mechanism.

The conveying mechanism is mounted on and sustained by a frame comprising a front longitudinal frame bar 6, a rear longitudinal frame bar 7, and end cross connecting bars 8 and 9, which frame is supported by legs adapted to rest on the floor. This conveying mechanism comprises a pair of fixed longitudinally extending horizontal parallel supporting bars 10 formed in their upper edges with two sets of aligned spoke blank receiving notches, one set 10$^a$ at the receiving ends of the bars, and a second set 10$^b$ at the opposite ends of the same; a pair of longitudinally extending parallel movable feed bars 11 which are disposed between the bars 10 and provided in their upper edges with aligned spoke receiving notches 11$^a$; and a second pair of longitudinally extending movable feed bars 12 disposed at the ends, and forming in effect continuations of the movable bars 11, the bars 12 being located respectively in rear of the two bars, and being provided in their upper edges with spoke blank receiving notches 12$^a$.

The notches 10$^a$ in the fixed bars 10 are, up to the point where the feed bars 12 begin, spaced a given uniform distance apart, and beyond this point the notches 10$^b$ are spaced from each other a greater distance apart, the purpose of which difference in spacing at the two ends of the bars will presently appear. The notches 11$^a$ in the movable feed bars 11 are spaced similarly to the spacing of the notches 10$^a$ of the associated fixed bars, and the spacing of the notches 12$^a$ in the movable feed bars 12, is similar to the spacing of the notches 10$^b$ in the associated fixed bars, the spacing of the notches 10$^b$ and 12$^a$ being, in the present instance, twice that of the spacing of the notches 10$^a$ and 11$^a$.

The front fixed supporting bar 10 is fixed to the upper ends of bracket arms 15 mounted on the front portions of transverse horizontal rods 16 and adjustably connected thereto by set screws 16$^a$ (see Fig. 10). The rods 16 are fixed in the upper ends of pillow blocks 17 fastened down on the front frame bar 6, and these extend beyond the rear sides of the pillow blocks as best shown in Fig. 10. In the present instance there are three of these transverse rods 16, which give support to the front fixed bar 10 at different points in its length. The rear fixed bar 10 is similarly supported by the rear portions of the transverse rods, said rear bar 10 being fastened to the upper ends of bracket arms 18 which are fixed at their lower ends to the rear portions of the rods 16.

The two sets of movable feed bars 11 and 12 are so mounted that they may be moved relatively to the fixed bars in vertical planes in successive cycles of operation in orbital paths, first upwardly, then forwardly, then downwardly, and finally rearwardly to their starting positions, and means are provided for causing the forward movements of the feed bars 11 to correspond in extent to the short spacing of the notches 10$^a$ of the fixed bars, and for causing the forward movements of the feed bars 12 to correspond in extent to the longer spacing of the notches 10$^b$ of the fixed bars, with the result that the spoke blanks will be advanced by the feed bars 12 at twice the speed of travel of those advanced by the feed bars 11, it being understood that in each cycle of movement of the movable feed bars, the spoke blanks supported in the notches in the fixed bars, will be lifted from said notches, carried forward, and then lowered into the next series of notches, the spokes thus being fed forwardly in a group in intermittent successive steps, as is well known in connection with feeding mechanisms of this general type.

To bring about this operation of the two sets of movable feed bars, the bars 11 have fixed at intervals to their lower edges, inner and outer bracket blocks 19 and 19$^a$ arranged in aligned pairs, which bracket blocks are mounted on transverse rods 20 and adjustably connected thereto by set screws 19$^b$. Links 21 loosely encircle at their upper ends the rods 20 and loosely encircle at their lower ends transverse rods 22. The rods 22 are journaled at their opposite ends in front and rear rock arms 23 and 24 fixed to transverse rock shafts 25 mounted in bearings at intervals along the machine frame. The front rock arms 23 have fixed to them, operating arms 26, which operating arms have their free ends pivotally connected together by horizontal longitudinally extending links 27, which arrangement causes the several rock shafts 25 to rock in unison. Due to this manner of supporting the movable feed bars 11, they will be caused to move up and down in unison in vertical planes when the rock shafts 25 are rocked, and in these up and down movements, they may be moved back and forth longitudinally, the links 21 in these back and forth movements, rocking on the rock arms 23.

The other movable feeding bars 12 are similarly supported for up and down movements in unison with the bars 11, the said bars 12 having fixed to their lower edges two pairs of bracket blocks 29 and 30. The blocks 29 loosely surround a transverse rod 31 on which are loosely mounted the upper ends of links 32, whose lower ends loosely surround a transverse rod 32$^a$ mounted at its ends in a front rock arm 33 and a rear rock arm 34, which rock arms are fixed to a transverse rock shaft 35 mounted in bearings in the end of the machine frame. The front rock arm 33 has depending from it an actuating arm 36 to which is pivoted one end of a horizontal link 37 which extends to the right, as in Fig. 2, and has its opposite end pivoted to the lower end of a rock arm 38 fixed to and depending from a horizontal transverse rock shaft 39 mounted in bearings 39$^a$ in the machine frame. A horizontal link 40 is pivoted at one end to the rock arm 38 and is extended to the right as in Fig. 3 and has its opposite end pivoted to a rock arm 41 depending from the adjacent transverse rock shaft 25 before alluded to. The rock shaft 39 has connected with it two rock arms 42 in which is loosely mounted a transverse rod 43, and the lower ends of links 44 are journaled on this rod and have their upper ends pivoted to the bracket blocks 30 fixed to the lower sides of the bars 12 near their right hand ends in Fig. 1 as before alluded to.

Due to the connections described, it will be understood that when the rock shaft 39 is operated, as will be presently described, the rock arms 38 and 42 thereon will be rocked, and through the connecting links 37, 40 and 27, the several rock arms 33, 42 and 23 will be rocked, and by means of the connections of these rock arms with the feeding bars 11 and 12, the latter will be moved up and down in unison.

The rocking of the shaft 39 is effected in the present instance by means of an arm 46 projecting upwardly from the rear end of the shaft and having its free end engaged by an edge cam 47 fixed to a transverse horizontal driving shaft 48 near the forward end of the latter, and constituting operating means for the movable feed bars. This drive shaft is mounted at its front end in the upper end of the bearing 39$^a$ before alluded to, and the shaft extends rearwardly and alongside the frame of the forging mechanism, where it is mounted in bearings 50 on the side of said frame. The shaft receives its motion from a pulley 65$^a$, see Fig. 2. The shape of the cam 47 is such that for every revolution of the same, the shaft 39 will be rocked and will result in the movement of the movable feed bars up and down. The feed bars are lowered after being raised by the cam, and the arm 46 maintained in engagement with the cam, by means of springs 46$^a$, see Fig. 1, which are connected respectively with the frame bar 6 and rods 16.

In order to impart to the feeding bars the orbital motion before referred to to cause the bars to advance a given distance in each cycle of operation, means are provided for imparting to the bars a reciprocating motion in a direction endwise of the bars, and this reciprocating motion is so coordinated with the up and down motions, as to bring about a resultant or component movement of the bars in the orbital path referred to. This reciprocating motion is imparted to the movable bars in the present instance by means of an eccentric 51 which is fixed to the shaft 48 just in front of the cam 47, which eccentric operates an eccentric rod 52 pivoted at its end to an upright lever arm or vibratory member 53 near the upper end of the latter. The lever arm is pivotally supported at its lower end on the frame bar 6 so that it may vibrate back and forth, and a horizontal link 54 has one end pivoted to the lever arm, about midway between its ends, and extends therefrom to the right, Fig. 1, and has its opposite end pivoted on a horizontal stud 55 extending between bracket arms depending from the movable bars 11. By this means, and by the rotation of the eccentric 47, the feed bars 11 will be reciprocated back and forth, the form of the cam in its relation to the vibratory lever arm being such, that the throw given the bars by the eccentric, will correspond in extent to the reduced spacing of the notches in said bars and the associated stationary bars.

The reciprocating motion of the feed bars 12 is imparted to them by means of the same lever arm 53, which for this purpose is pivoted at its upper end to one end of a link 57 which latter extends to the left as in Fig. 4, and has its opposite end pivoted to a transverse rod 58 fixed to and extending between the feed bars 12. By reason of the longer leverage of the lever arm 53 on the bars 12, a greater throw will be given these bars than that of the bars 11, the relation of the parts being such that this greater throw will equal in extent the wider spacing of the notches in the bars 12 and the notches 10$^b$ of the associated fixed bars.

From the foregoing description it will be understood that with the notches in the fixed bars filled with the spoke blanks, the feeding motion imparted to the movable bars by the mechanism described, will cause them to move through orbital paths in successive cycles of operation, the said bars in each cycle moving upwardly, then forwardly, then downwardly, and finally rearwardly to their starting positions, the bars 12 in their forward movements advancing twice the distance of the forward movements of the bars 11. As a result of this action, the spoke blanks in each cycle of movement of the bars, will be lifted from the notches in the fixed bars and transferred to the next notches, whereby the spokes will be advanced as a group in intermittent steps, with those acted on by the bars 12 advancing at double the speed of those acted on by the bars 11.

As best shown in Fig. 7, the blanks fed by the bars 11 will have their ends projected into the heating zone of the furnace, and while subject to the heat of the furnace they will travel at a comparatively slow rate. In leaving the furnace, the heated blanks will be transferred by the feeding action of the bars 11 to the end portions of the fixed bars containing the more widely spaced notches 10$^b$, and at this point the spokes will be acted on and fed by the movable bars 12, and their rate of advance will be correspondingly more rapid. The portions of the bars 10 containing the more widely spaced notches, extend to the forging mechanism 3, and the movable bars 12 likewise extend from the end of the bars 11 to said forging mechanism, so that the heated spoke blanks will be fed from the furnace to the forging mechanism at a comparatively rapid rate, and thereby loss of heat by radiation will be reduced to a minimum.

In starting the operation of the conveying mechanism described, the spoke blanks are placed side by side on an inclined feed table 59, see Fig. 2$^a$, which leads to the receiving ends of the stationary bars 10, the relation of the end of the table to the ends of the bars being such that the leading spoke blank $a$ will bring up against and be arrested by the vertical ends of the bars 10. The motion of the feed bars 11 being started, they will first rise and their first notches 11$^{a1}$ will engage beneath the first blank $a$ and will lift the same from behind the ends of the bars 10, and as the bars 11 move forwardly, the blank will be carried forwardly to a position over the first notches 10$^{a1}$ in the fixed bars, and as the bars 11 move downwardly in their cycle of operation, the blank will be deposited in said notches 10$^{a1}$. In the meantime the next blank $b$ will roll down and take the place of the preceding blank, and the bars 11 will return to their starting position, and as the movements of the bars 11 are repeated, they will pick up the leading blanks in succession as they roll down the inclined table, and will deposit them in succession in the first notches in the fixed bars, and at the same time the blanks previously deposited on the fixed bars will be advanced one step for each operation, and these actions will continue until all of the notches in the fixed bars have been filled with the spoke blanks, whereupon they will begin to feed out at the ends of the bars and be presented to the action of the forging mechanism in succession.

By reason of the adjustable connection of the bracket blocks 19$^a$ with the transverse rods 20, and the adjustable connection of the bracket blocks 15 with the rods 16, the front movable bar 11 may be set at different distances from the rear bar, and the front fixed bar 10 may be set at different distances from the rear fixed bar, by adjusting the blocks 19$^a$ along the rods 20, and the blocks 15 along the rods 16, and this in order to accommodate spoke blanks of different lengths. In such adjustments of the blocks, the forward links 21 will of course be shifted along the two rods 20 and 22 so that they will conform in position to the new setting of the blocks 19$^a$.

The heating furnace is in the present case of elongated form, and the heating chamber thereof is formed in its side adjacent the feeding mechanism, with a slot or opening into which the ends of the spoke blanks supported by the feeding bars extend, and through which they are advanced in the feeding action of the bars.

From the foregoing description it will be understood that in the operation of the feeding mechanism in co-operation with the forging mechanism, the heated spoke blanks are presented in succession to the forging mechanism and in the next feeding action the finished spoke blank is moved out of the range of action of the forging mechanism and the next blank is brought into position for operation, and so on, the blanks being thus acted on in succession as they are fed in succession to the forging mechanism, and the finished shouldered spokes being discharged in succession from the machine. In the discharge of the finished spoke blank after the forging operation is completed, the movable feed bars in rising will lift the spoke blank from the pair of notches in the fixed bars in which it was seated in the forging operation, and will deposit the same in the last pair of notches in said bars as shown by dotted lines, and indicated by the reference letter A, in Fig. 6. When now the movable feed bars again rise after the next forging operation, their upper edges, which are unnotched and inclined downwardly from this point to their ends as indicated at 12$^b$ in Figs. 1, 5, 6 and 7, will engage and lift the shouldered spoke blank A from the last pair of notches in the fixed bars, and this spoke being received on the inclined smooth portions of the bars 12, will roll down on the same by gravity and thus be discharged from the machine.

The spoke blanks, as they are advanced after being delivered from the inclined feed table to the feed bars, are lined up evenly on the bars by means of a fixed gage plate or rail 90, best shown in Figs. 1 and 2, which rail extends at the front of the front fixed feed bar 10 from a point where the blanks are delivered to the feed bars to a point where the bars 11 terminate, the said rail being in position to be engaged by the outer ends of the blanks as they travel forwardly. At its end where the spoke blanks pass from the feed table onto the feed bars, the gage rail is inclined or offset as at 90ª so that the ends of the blanks engaging this inclined portion will be forced inwardly and lined up evenly on the feed bars.

While in the foregoing description and accompanying drawings I have set forth the invention in the particular detailed form and arrangement of the parts, which in practice have been found to answer to a satisfactory degree the ends to be attained, it will be understood that these details may be variously changed and modified without departing from the spirit of the invention; and further it will be understood that the invention is not limited to any particular form or arrangement of the parts except in so far as such limitations are specified in the claims.

Having thus described my invention, what I claim is:

1. In a conveying mechanism, the combination of a frame, bars sustained fixedly relatively thereto to support the articles to be conveyed, two sets of movable feed bars associated with the fixed bars to advance the articles thereon, and supported from the frame to move up and down and also horizontally endwise, operating means for the movable bars, connections between said operating means and the two sets of movable bars formed to move them up and down in unison, a pivotally mounted vibrating member, a connection between the operating means and said vibrating member for operating the latter, and means connecting said two sets of bars with the vibrating member at relatively different distances from the pivotal axis of the latter; whereby the two sets of movable bars will be moved horizontally relatively different distances.

2. In a conveying mechanism, the combination of a frame, bars sustained relatively thereto to support the articles to be conveyed, two sets of movable feed bars associated with the fixed bars to advance the articles thereon, said movable bars being supported from the frame to move up and down and also horizontally endwise, operating means for the movable bars, connections between the operating means and movable bars to move the latter up and down, a pivotally mounted vibrating member, a connection between the operating means and said vibrating member for operating it, means connecting the first set of movable bars with the vibrating member to move said bars horizontally, and a device connected with said second set of bars and with the vibrating member at a point further from the pivotal axis of the vibrating member than the point of connection therewith of the other set of bars.

3. In a conveying mechanism, the combination of a frame, bars sustained fixedly relatively thereto to support the articles to be conveyed, two sets of movable feed bars associated with the fixed bars to advance the articles thereon, said sets of movable bars being supported from the frame to move up and down and also endwise horizontally, an operating shaft, a cam thereon, a rocking arm engaged by the cam and operatively connected with the two sets of movable bars to move them up and down, a pivotally mounted vibrating member, an eccentric on the shaft operatively connected with the vibrating member for vibrating it, a link pivoted to the vibrating member and to the second set of movable bars for moving the same horizontally, and a second link pivoted at one end to the vibrating member at a point between its pivotal axis and point of pivotal connection of the first mentioned link, and pivoted at its opposite end to the first set of movable bars.

4. In a conveying mechanism, the combination of fixed bars to support the articles to be conveyed, movable feed bars disposed alongside the fixed bars and movable to cause the advance of the articles on the fixed bars, means for adjusting the movable bars to and from each other, and means for similarly adjusting the fixed bars relatively to accommodate articles of different lengths.

5. In a conveying mechanism, the combination of a frame, a series of transverse rods fixedly supported thereon, bars sustained by said rods one in front of the other to support the articles to be conveyed and adjustable one to and from the other to accommodate articles of different lengths, a second series of transverse rods sustained by the frame and movable up and down relatively thereto, front and rear movable feed bars mounted on said movable rods and extending alongside the fixed bars and operable by movement of the rods to feed the articles on the fixed bars, said movable feed bars being adjustable one to and from the other to accommodate articles of different lengths.

6. In a conveying mechanism, the combination of a plurality of fixed bars provided in their upper edges with aligned notches to receive the articles to be conveyed, a plurality of movable feed bars associated with the fixed bars and provided in their upper edges with aligned notches, means for moving the movable bars in orbital paths in a vertical plane to advance the articles on the fixed bars from notch to notch, and an inclined feed table on which the articles are supported one above the other in contacting relation, said table terminating at its lower end in such relation to the ends of the fixed feed bars that the leading article on the table will be arrested by the ends of the fixed bars in a position to be lifted by the movable bars in their upward movement and transferred by their forward movement to the notches in the fixed bars; whereby the articles on the table will move down automatically by gravity as the leading one is lifted from the series.

In testimony whereof, I have affixed my signature hereto.

ERNEST E. EINFELDT.